(12) United States Patent
Tonca

(10) Patent No.: US 7,534,275 B2
(45) Date of Patent: May 19, 2009

(54) HYDROGEN GENERATOR

(76) Inventor: Florian Tonca, 10962, 63A Avenue, Delta (CA) V4E 3B7

( * ) Notice: Subject to any disclaimer, the term of this patent is extended or adjusted under 35 U.S.C. 154(b) by 646 days.

(21) Appl. No.: 10/906,355

(22) Filed: Feb. 15, 2005

(65) Prior Publication Data

US 2005/0178061 A1 Aug. 18, 2005

(30) Foreign Application Priority Data

Feb. 16, 2004 (CA) .................................. 2457707

(51) Int. Cl.
*B01J 7/00* (2006.01)
*H01M 8/06* (2006.01)
*C01B 3/02* (2006.01)
*C01B 3/08* (2006.01)

(52) U.S. Cl. .................. 48/61; 423/648.1; 423/657

(58) Field of Classification Search .............. 48/61; 423/648.1, 657
See application file for complete search history.

(56) References Cited

U.S. PATENT DOCUMENTS

| | | | |
|---|---|---|---|
| 767,289 A * | 8/1904 | Kirkwood ................. 422/117 |
| 5,456,889 A * | 10/1995 | Pow et al. ................. 422/173 |
| 5,593,640 A * | 1/1997 | Long et al. ................ 422/111 |
| 5,817,157 A * | 10/1998 | Checketts .................... 48/61 |
| 6,506,360 B1 * | 1/2003 | Andersen et al. ........... 423/657 |
| 2001/0025670 A1 * | 10/2001 | Ovshinsky et al. ......... 141/231 |
| 2002/0048548 A1 * | 4/2002 | Chaklader .................. 423/657 |
| 2002/0081235 A1 * | 6/2002 | Baldwin et al. ........... 422/105 |

* cited by examiner

*Primary Examiner*—Alexa D Neckel
*Assistant Examiner*—Matthew J Merkling
(74) *Attorney, Agent, or Firm*—Oyen Wiggs Green & Mutala LLP

(57) ABSTRACT

This invention relates to a hydrogen generator system for generating hydrogen from water split reaction. The generator comprises a pressure container having a reactant water inlet, and a product hydrogen outlet. Pluralities of cells are vertically stacked inside the container; each cell contains a reactant compound comprising a mechanical mixture of metal and an anti-passivation material. The reactant compound produces hydrogen gas upon contact with water, and the cells are stacked such that water entering from the inlet can rise inside the container and sequentially activate each immersed cell to produce hydrogen gas.

26 Claims, 7 Drawing Sheets

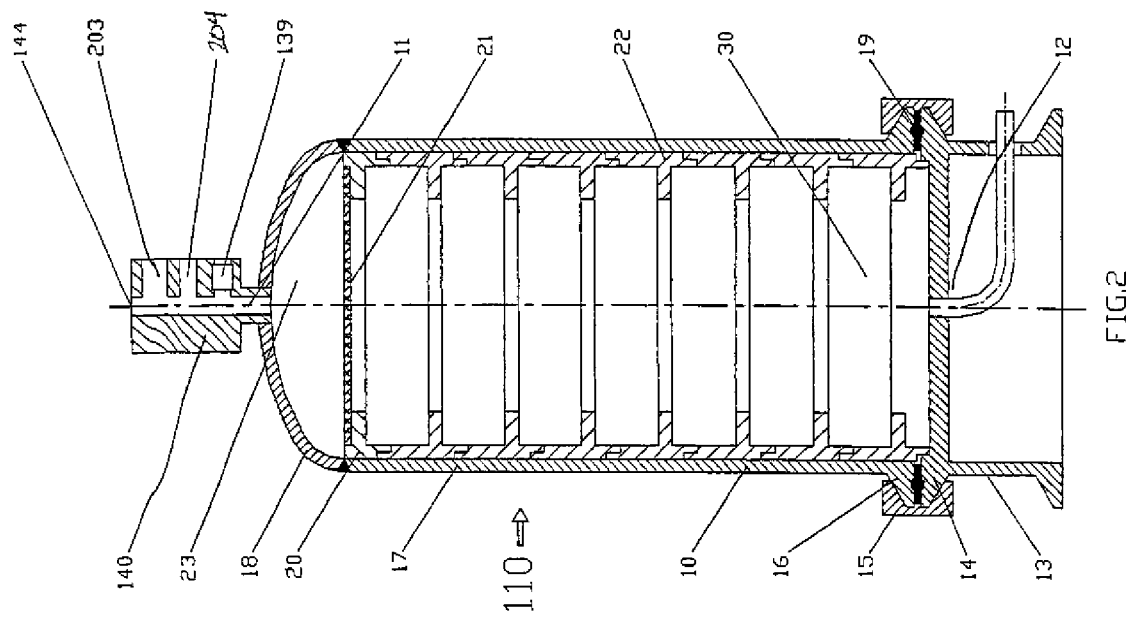
FIG.2
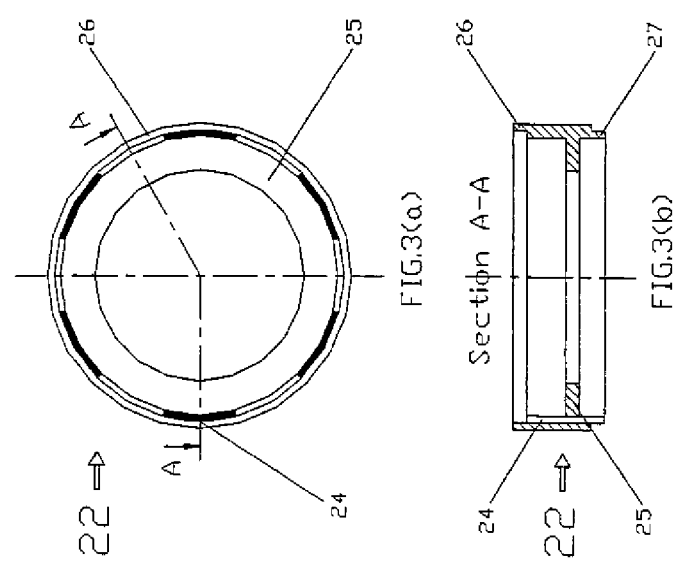
FIG.3(a)
Section A-A
FIG.3(b)

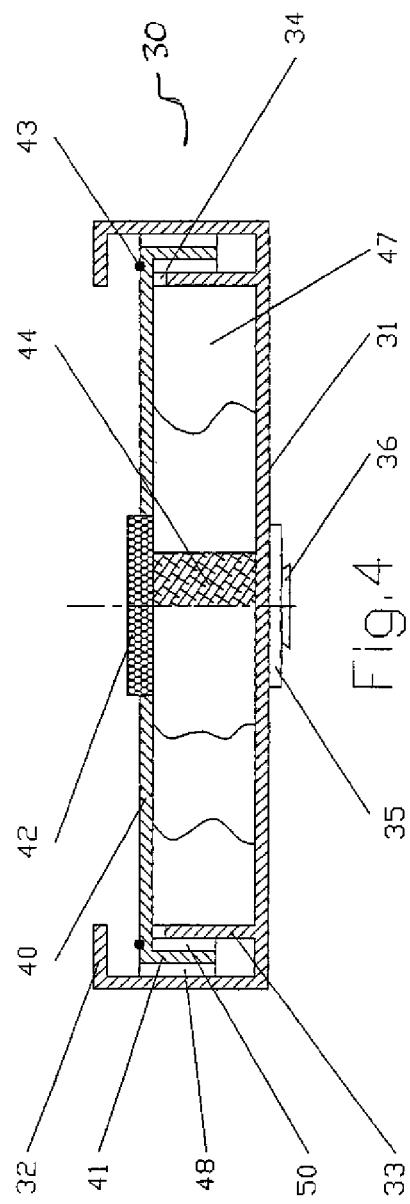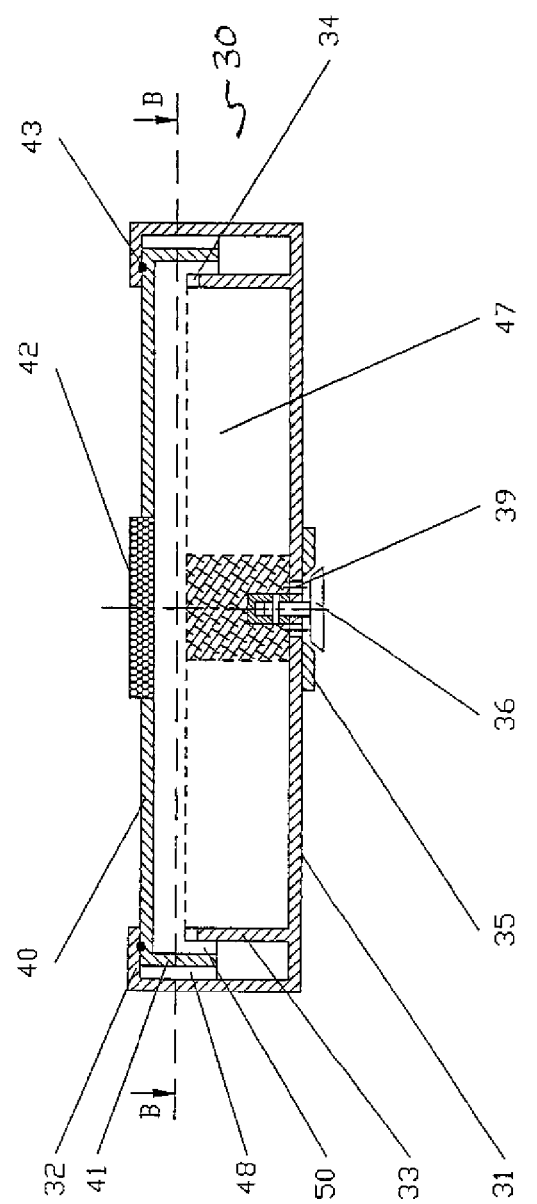

_US 7,534,275 B2_

HYDROGEN GENERATOR

FIELD OF THE INVENTION

This invention relates generally to hydrogen generation, and in particular, to methods and apparatuses for generating hydrogen on demand from water split reaction.

BACKGROUND OF THE INVENTION

Hydrogen is commonly used in the Haber process for making ammonia. It is also used in various other industrial processes, such as the reduction of oxide ores, the refining of petroleum, the production of hydrocarbons from coal, and the hydrogenation of vegetable oils. There has also been considerable interest in developing a "hydrogen energy economy" in which hydrogen is electrochemically combined with oxygen in a fuel cell to produce electricity. Producing power using fuel cells offer a number of advantages over conventional means such as internal combustion engines. For example, fuel cells produce energy through electrochemical conversion, instead of combustion, and thus harmful emissions tend to be very low, or zero if pure hydrogen is used. Also, fuel cells can produce power at efficiencies that are much higher than conventional power systems such as the internal combustion engine.

While hydrogen is the most abundant element in the universe, pure hydrogen ($H_2$) rarely occurs naturally on Earth. Instead, it is found in other compounds such as hydrocarbons and water. The most common process for producing hydrogen is by steam reforming natural gas. It can also be made by the Bosch process and by electrolysis of water. Reforming natural gas or other hydrocarbons is a complex process that can produce undesirable byproducts such as carbon dioxide and nitrous oxides. Electrolysis is an energy intensive process that and can involve complex, bulky and costly equipment to produce hydrogen in large quantities.

Another method of extracting hydrogen from water involves chemically reacting water with a metal ("water split reaction"). For example, it has long been known that hydrogen gas can be produced in a chemical process utilizing an alkali metal or metal hydride reacted with water.

Other metals are also known to produce hydrogen when reacted with water; for example, U.S. Pat. No. 6,440,385 (Chaklader) discloses a method of producing hydrogen from water by submerging a mechanical mixture of aluminum oxide(s) and/or aluminum hydroxide(s) and aluminum metal in water. U.S. Pat. No. 6,582,676 (Chaklader) discloses a method of producing hydrogen by reacting a metal selected from the group consisting of aluminum, magnesium, silicon, and zinc, with water in the presence of an effective amount of a catalyst at a pH of between 4 and 10. The catalyst (promoter) is selected to prevent or slow down deposition of the reaction products on the metal that tend to passivate the metal.

None of the known methods and apparatuses for producing hydrogen by a water-split reaction provides a low cost, efficient solution for providing hydrogen on demand. In particular, neither U.S. Pat. Nos. 6,440,385 nor 6,582,676 disclose a practical, cost-effective and efficient apparatus for generating and collecting pressurized hydrogen on demand according to the methods taught in those patents.

SUMMARY OF THE INVENTION

According to one aspect of the invention, there is provided a hydrogen generator system for generating hydrogen from water split reaction. The system comprises a pressure container having a water inlet for fluidly coupling to a water source and for flowing water to a bottom of the container, and a product hydrogen outlet for fluidly coupling to a hydrogen consumer and for flowing hydrogen collected inside the container to the consumer. The system also comprises a plurality of cells vertically stacked inside the container; each cell contains a reactant compound comprising a mechanical mixture of a reactant metal and an anti-passivation material. The reactant compound produces hydrogen gas upon contact with water. The cells are fluidly communicative with water and hydrogen gas and are stacked inside the container such that water rising from the bottom of the container sequentially activates each immersed cell to produce hydrogen gas. This "vertical cascading" of the cells enable hydrogen to be produced in a controlled manner by controlling the flow rate of water into the container. In particular, the water flow rate can be controlled in response to the changes in the flow rate of hydrogen demanded by the consumer.

The system can further comprise a gas expansion device and/or a liquid expansion device that are fluidly coupled to the container. The gas expansion device can be coupled to the hydrogen outlet and be calibrated to receive and store hydrogen gas produced by the generator at a selected charging pressure. In particular, the gas expansion device can be a hydrogen storage buffer that is calibrated to discharge stored hydrogen to the consumer at a selected discharge pressure. The buffer can be a pressure vessel containing a metal hydride. The liquid expansion device can be fluidly coupled to the water inlet and be calibrated to receive and store water at a selected pressure. The gas and liquid expansion devices can be calibrated to maintain the operating pressure in the container at a relatively low pressure, thereby enabling the container to have a relatively low pressure rating, which reduces manufacturing cost and container weight.

The reactant metal can be selected from the group consisting of aluminum (Al), magnesium (Mg), silicon (Si), and zinc (Zn). The anti-passivation material can be selected from group consisting of alumina, ceramic compounds containing aluminum ions, carbon (C), calcium carbonate ($CaCO_3$), calcium hydroxide ($Ca(OH)_2$), polyethylene glycol (PEG), and combination thereof, magnesium oxide (MgO), silicon dioxide ($SiO_2$), and (ZnO).

Each cell can comprise a shell having a plurality of partitions inside the shell that define a plurality of compartments that each store reactant compound; the partitions are made of a semi-permeable material that is permeable to water and gas but impermeable to the reactant compound. In particular, the partition material can be reticular aluminum foam. Each cell can further comprise a buoyant water feed valve located in an opening in the top of the shell; the valve is in a depressed open position that allows water into the cell when the reactant compound is dry, and is in an elevated position that closes the opening in the top of the shell to outside water when the cell is filled with water. The inner volume of the cell can be selected to accommodate the expansion of reacted reactant compound. Furthermore, the inner volume of the cell can be selected so that the expansion of reacted reactant compound elevates the water feed valve into a closed position.

The cells can each further comprise a buoyant water drain valve located in a water drain in the bottom of the shell; the drain valve is in a depressed open position when the cell is not immersed in water, and is in an elevated position that closes the water drain when the water level outside the cell rises above the bottom of the shell.

According to another aspect of the invention, there is provided a hydrogen generator system for generating hydrogen from a water split reaction, comprising:

a) a reactor comprising
   i) a pressure container having a water inlet for fluidly coupling to a water source and flowing water to a bottom of the container, and a product hydrogen outlet for fluidly coupling to a hydrogen consumer and flowing hydrogen collected inside the container to the consumer; and
   ii) a plurality of cells vertically stacked inside the container and containing a reactant compound comprising a mechanical mixture of a reactant metal and an anti-passivation material and producing hydrogen gas upon contact with water, the cells being fluidly communicative with water and hydrogen gas and stacked such that water rising from the bottom of the container sequentially activates each immersed cell to produce hydrogen gas;
b) a hydrogen storage buffer fluidly coupled to the reactor, calibrated to receive and store product hydrogen gas from the reactor at a selected charging pressure, and to discharge hydrogen gas to the consumer at a selected discharge pressure; and,
c) a water supply circuit fluidly coupled to the water inlet of the reactor and having a pump for delivering water from a water source to the cells.

The system can further comprise a controller communicative with the pump and programmed to operate the pump to deliver water to the reactor at a rate that corresponds to the rate of hydrogen demanded from the hydrogen consumer. The controller can operate the pump to deliver water to the cells at a rate that activates a cell to produce hydrogen around the same time the hydrogen production rate of a below activated cell begins to decline.

The system can further comprise a water expansion device for providing isobaric expansion inside the container and which is fluidly coupled to the water supply circuit and has a valve calibrated to open at a selected pressure to allow water from the container into the water expansion device.

In this system, a plurality of reactors can each be fluidly coupled in parallel to the buffer and to the water supply circuit. Each reactor can comprise a water flow control valve coupled to the water supply circuit; the controller can be programmed to operate each control valve to independently control the flow of water into each reactor. This enables the system to produce hydrogen in both "horizontally cascaded" and a "vertically cascaded" manner, by staggering the activation of each reactor within the system (horizontal cascade) and by staggering the activation of each cell within each reactor (vertical cascade).

BRIEF DESCRIPTION OF THE DRAWINGS

The following is a brief description of drawings that illustrate embodiments of the invention:

FIG. 2 is a schematic cut-away side view of the reactor.

FIG. 3(a) is a schematic cut-away top view of a reactant compound cell holder

FIG. 3(b) is a schematic cut-away side view of the cell holder shown in FIG. 3(a) at section A-A.

FIG. 4 is a schematic cut-away side view of a dry reactant compound cell.

FIG. 5 is a schematic cut-away side view of a hydrated reactant compound cell.

DETAILED DESCRIPTION OF EMBODIMENTS OF THE INVENTION

Directional terms such as "top", "bottom", and "upwards" are used in the following description for the purpose of providing relative reference only, and are not intended to suggest any limitations on how any apparatus is to be positioned during use, or to be mounted in an assembly.

System

Figure 1:
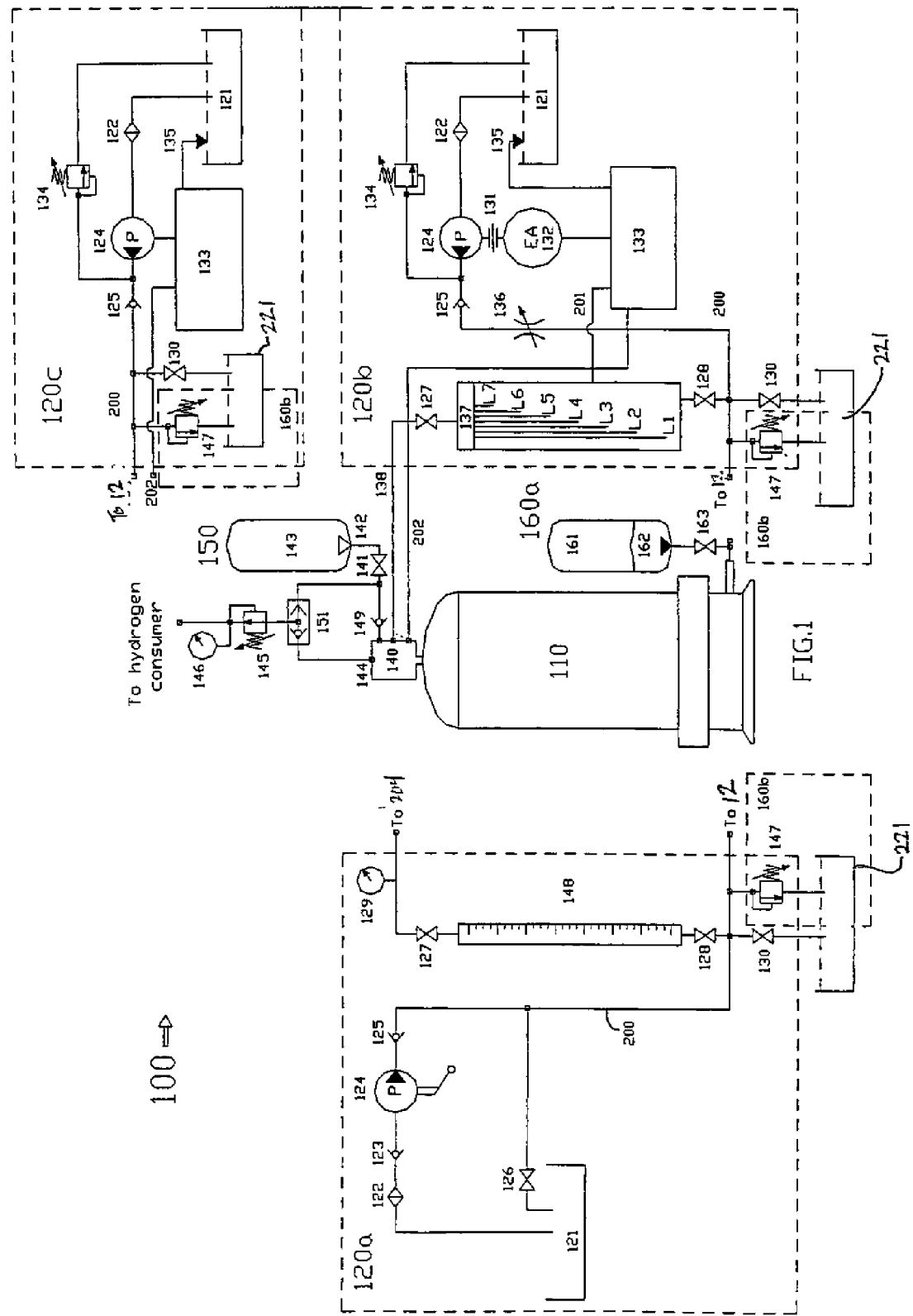
FIG. 1 is a schematic view of a hydrogen generator system comprising a hydrogen reactor and a first water supply circuit attached to the reactor; also shown are a second and a third water supply circuits that can be coupled to the reactor.

Referring to FIG. 1 and according to one embodiment of the invention, a hydrogen generator system 100 is provided that produces hydrogen on demand by reacting water with a water-split reactant compound. The main components of the system 100 are: a reactor 110 containing the reactant compound, a water supply circuit 120(a), 120(b) or 120(c) for supplying water to the reactor 110, a hydrogen discharge manifold 140 for coupling to a hydrogen consumer (not shown), and gas and liquid expansion mechanisms 150, 160(a), and 160(b) that enable the pressure within the reactor 100 to be maintained at a relatively low level. The gas expansion mechanism 150 in this embodiment is a hydrogen buffer that also serves to temporarily store hydrogen produced by the reactor 110 when the rate of hydrogen produced exceeds the rate demanded and for discharging stored hydrogen to the consumer when the rate demanded exceeds the rate produced.

FIG. 1 shows three different water supply circuits 120(a), 120(b) and 120(c) that can be coupled to the reactor 110. A first automatically actuated water supply circuit 120(b) is shown coupled to the reactor 110, and a manually actuated water supply circuit 120(a) and a second automatically actuated water supply circuit 120(c) are shown uncoupled.

In operation, water from the water supply circuit 120 is pumped into the reactor 110 at a rate that corresponds to the expected hydrogen consumption load of the coupled hydrogen consumer. Water inside the reactor 100 produces hydrogen gas upon contact with the reactant compound, and the produced hydrogen gas is transmitted to the hydrogen consumer via the discharge manifold 140. The hydrogen consumer can be a fuel cell stack, a storage tank or any other device that uses or stores hydrogen.

Hydrogen Reactor

Referring to FIG. 2, the hydrogen reactor 110 comprises a container 10 having a main hydrogen discharge outlet 11 at the top of the container 10 that is coupled to the discharge manifold 140, a plurality of reactant unit cells 30 and cell holders 22 vertically-stacked inside the container 10, and a water intake port 12 at the bottom of the container 10 that supplies water to each of the cells 30 for the water-split reaction. Each cell 30 is a cartridge that contains a reactant compound comprising a mechanical mixture of reactant metal and an anti-passivation material, both in powder form.

The container 10 is a generally cylindrical pressure vessel having a side wall 17, a domed top end cap 18, and a bottom end plate 14 removably attached to a bottom edge flange 16 of the side wall 17 by clamps 15. An O-ring 19 is located between the bottom edge flange 16 and end plate 14 to provide a fluid-tight seal. The bottom end plate 14 has a cylindrical, downwardly-extending guard 13 that also serves as a stand for the container 10; the guard 13 has an opening in its side to allow fluid access to the water intake port 12. While the container 10 is generally cylindrical in this embodiment, the container 10 can have other shapes, sizes, and configurations as is known in the pressure vessel art, so long as such design provides a closed-to-ambient, fluidly sealed environment for the water split reaction to occur, and for produced hydrogen to be contained and collected. The container 10 is made from conventional pressure vessel materials that enable the container 10 to withstand pressures up to 150 psig; with such a relatively low pressure rating, container weight and manufacturing cost can be kept relatively low, thereby enabling the system to be relatively portable, and relatively inexpensive.

Mounted inside the container 10 and above the stacked cells 30 is a dehumidifier 20 for entrapping and removing water moisture produced by evaporation that is exacerbated by the heat generated by the water split reaction. It is desirable to remove water from the product hydrogen gas stream for reasons known in the art, e.g. to keep the gas flow passages within the system 100 clear. The gas dehumidifier contains a frame across which is stretched a moisture-retaining membrane or group of membranes 21 that retain moisture from condensation or from the product hydrogen gas stream passing there through. The membrane material is known in the art, and for example, can be found in humidity exchangers used in the fuel cell industry. The membrane 21 is permeable to hydrogen but retains water. The thickness of a single membrane or plurality of overlapped membranes is selected to ensure adequate moisture removal. The dehumidifier 20 can be removed between hydrogen production cycles and dried.

Each cell 30 is located inside the container 10 by its corresponding cartridge holder 22. Referring now to FIGS. 3(*a*) and (*b*), the holder 22 is an annular bracket that has an outer circumference that corresponds to the inside circumference of the container 10, such that the holder 22 can slide snugly within the container 10. Each holder 22 comprises an annular lip 25 and a vertically extending side wall 26. The corresponding cell 30 is seated on the lip 25 within the side wall 26. The top and bottom edges of the holder side wall 26 have matching notches 27 to enable the holders 22 to securely stack together. The side wall 26 has a plurality of vertical slots 24 that provide vertical fluid flow communication between holders 22.

Referring again to FIG. 2, product hydrogen gas flows from each unit cell 30 upwards into a hydrogen discharge chamber 23 at the top of the container 10, and finally out of the container 10 via the main discharge outlet 11 and into the manifold 140. The manifold 140 comprises a discharge port 144 for fluidly coupling the container 10 to the hydrogen consumer, a buffer port 203 for fluidly coupling the container 10 to the hydrogen buffer 150, a gaseous pressure port 204 for fluidly coupling the container 10 to a liquid level measuring device (shown in FIG. 1 as device 148 and multi-level switch 137). The manifold 140 further comprises a pressure sensor 139 that electrically communicates via wiring 202 with a controller 133 (shown in FIG. 1).

Reactant Compound

Hydrogen gas can be produced from water by contacting the water with a reactant compound comprising a suitable water-reactive metal and an anti-passivation material; such a reaction is known as a "water split reaction". The reactant metal is a metal selected from the group consisting of aluminum (Al), magnesium (Mg), silicon (Si), and zinc (Zn). The anti-passivation material is a material that slows or prevents the passivation of the metal, such as the metal's oxide. In particular, the anti-passivation material serves to prevent or slow down the deposition of reaction products on the reactant metal surface that tend to passivate the reactant metal and thereby inhibit the water-split reaction. The anti-passivation material can be a material selected from the group consisting of boehmite, dolomite, alumina, suitable ceramic compounds containing aluminum ions, carbon (C), calcium carbonate ($CaCO_3$), calcium hydroxide ($Ca(OH)_2$), polyethylene glycol (PEG), and combination thereof, magnesium oxide (MgO), silicon dioxide ($SiO_2$), and (ZnO). All of the anti-passivation additives mentioned above will work for aluminum, except MgO, $SiO_2$, and ZnO, which will work only for respectively Mg, Si, and Zn. It is also possible to generate hydrogen in water split reaction by combining the anti-pasivation additives but also combining the metals in certain ratios, like alloying them.

It is known that aluminum has a very high affinity for oxygen, and that aluminum can be reacted with water molecules to split the water molecules and release hydrogen according to the following equation:

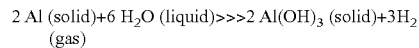
$$2\,Al\,(solid) + 6\,H_2O\,(liquid) >>> 2\,Al(OH)_3\,(solid) + 3H_2\,(gas)$$

One way of carrying out this reaction is by immersing aluminum pieces in water. As the reaction progresses, the aluminum passivates, i.e. a thin oxide/hydroxide passivation layer builds on the metal surface of each piece, thereby preventing further oxidation of the underlying metal, and thus ceasing the hydrogen producing reaction. To improve hydrogen gas production, metallic aluminum can be used in powder form in order to increase the reaction surface area, and the aluminum oxide can also be in powder form and be mixed into the aluminum powder. The hydrated alumina generated by the oxidation of aluminum will preferentially adhere to the surface of the anti-passivation material rather than to the surface of metal. Thus, the anti-passivation material prevents the thickening deposition of the passivation layer around the metal particles beyond which the oxidation reaction is not further possible.

Figure 7A:
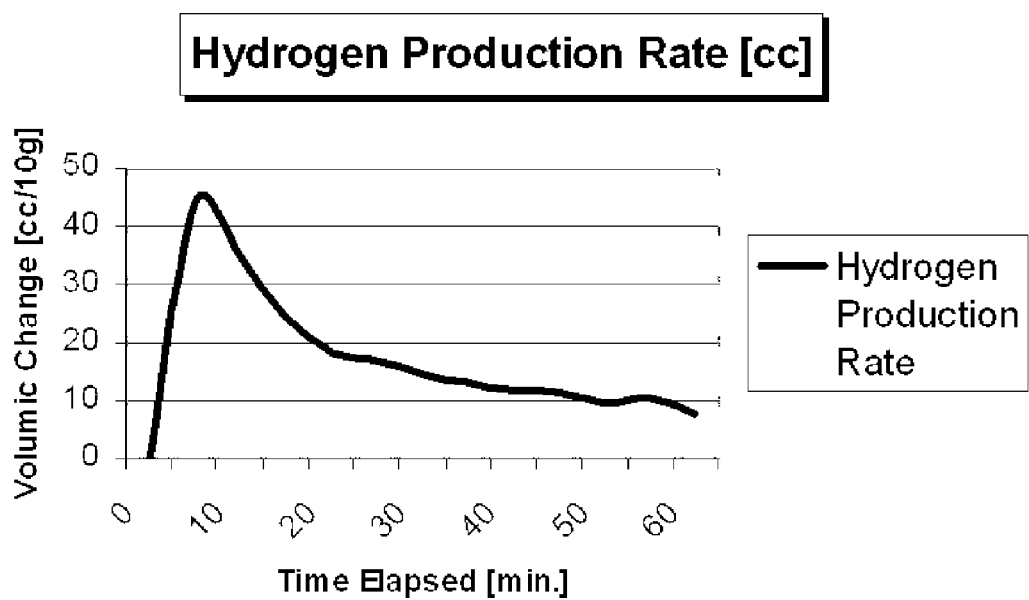
FIG. 7(a) is a graph of water split reaction profile of aluminum/aluminum oxide reactant compound in water

When water contacts a reactant compound comprising aluminum reactant metal in powder form, a water-split reaction starts almost immediately and hydrogen gas is released. FIG. 7(*a*) illustrates a water split reaction profile for a reactant compound comprising of aluminum as reactant metal and aluminum oxide as anti-passivation material. The profile shows that within a one hour time span, the hydrogen production rate peaks within a few minutes of activation, and slowly decreases thereafter. Although the hydrogen production rate declines steeply after one hour, some production continues even after 12 hours. Such reaction is known in the art and is thus not described in any further detail here. To maintain a steady supply of product hydrogen to the hydrogen consumer, hydrogen production can be "cascaded" by activating a fresh cell 30 to produce hydrogen when the production from an activated cell 30 begins to decreases, as shown in FIG. 7(*b*). Note that the profiles shown in FIGS. 7(*a*) and (*b*) are merely illustrative of the change in hydrogen production rates in a water split reaction, and do not represent specific flow rates, pressures, amounts of reactants, timing of sequences or any other specific performance data related to the system 100.

The reactant compound used in the system 100 is a mechanical mixture of aluminum/aluminum oxide powder with particles in the size range between 0.01 through 1000 microns. The reactant metal and anti-passivation material are blended together into intimate physical contact. Preparation of the reactant compound is known in the art and thus is not described in detail here.

The preparation of the reactant compound and loading of the compound into the cells 30 should be performed in an inert environment that prevents oxidation of the reactant metal with ambient air. The anti-passivation material is ineffective in air; once the metallic aluminum is exposed to air, a thin passivation layer is formed immediately around the tiny microscopic particles. However, the anti-passivation material works in water where it imposes selectivity on to the oxidation layer that will adhere rather to the surface of additive than to the surface of metal.

Reactant Compound Cells

Figure 6:
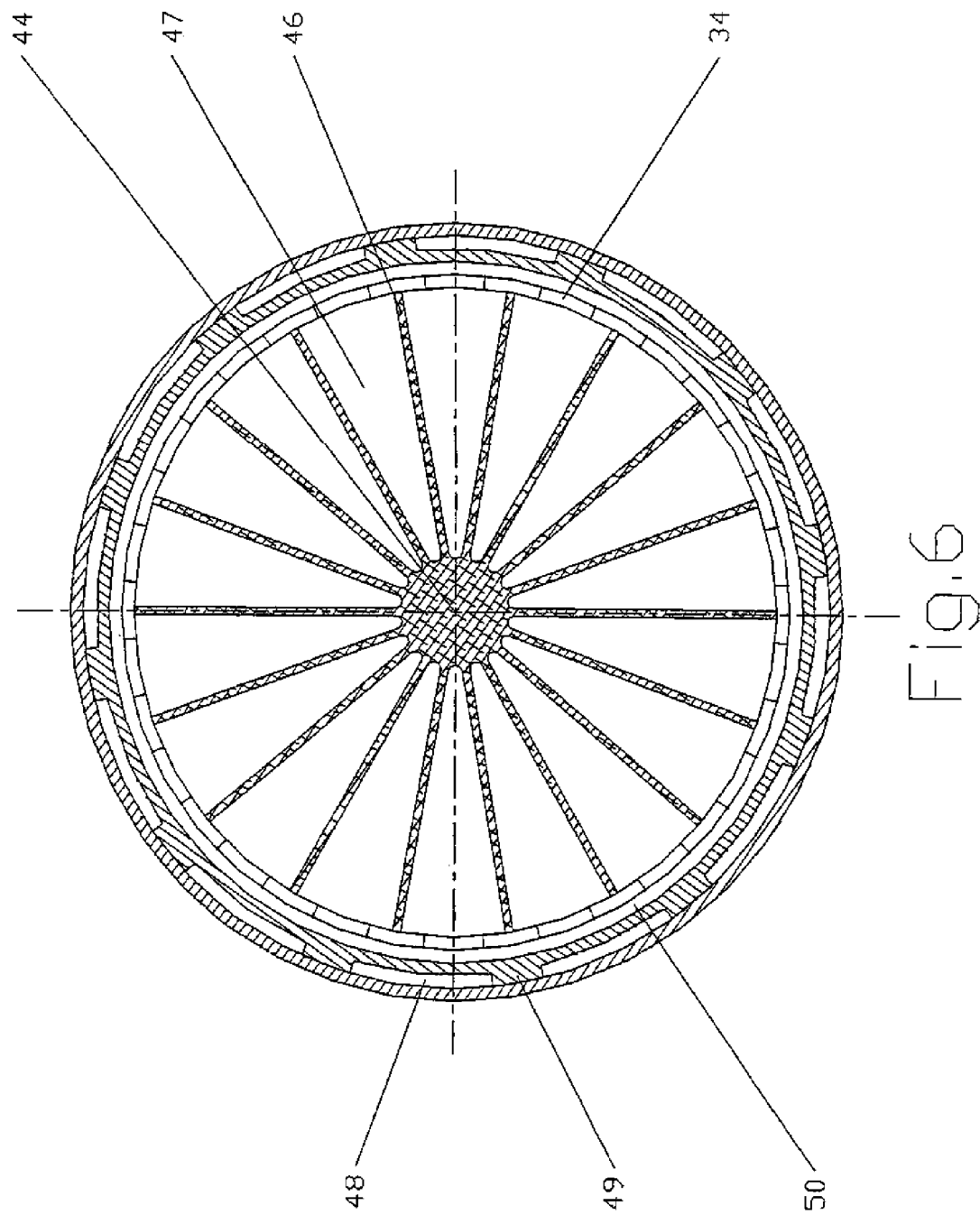
FIG. 6 is a schematic cut-away top view of the cell shown in FIG. 5 at section B-B.

Referring now to FIGS. 4 to 6, each cell 30 has a shell 31 comprising a circular base plate and a cylindrical outer side wall extending vertically upwards from the base plate and terminating with an inwardly-extending annular lip 32. Also extending vertically from the base plate and inset from the outer side wall is a cylindrical inner side wall 33 which terminates at a vertical distance below the lip 32. Spaced along the top edge of the side wall 33 there are a plurality of radial grooves 34 that serve to allow water into the cell 30. As the shell 31 does not serve as a pressure vessel, it can be made from a thin aluminum metal sheet, such as foil.

A water drain 39 passes through the center of the base plate 31. A drainage control device 35 is connected to the drain 39 and controls the flow of water through the drain 39. In particular, the drainage control device 35 comprises a buoyant check valve 36 that floats when immersed in water; when the cell 30 is immersed in water, the drain 39 is thus closed by the check valve 36, and when not immersed, the check valve 36 opens under gravity to allow unreacted water to flow out of the cell 30. Such drain 39 and drainage control device 35 are optional, as under ideal conditions all the water entrapped in the cell 30 will be reacted with the reactant compound.

A semi-permeable porous core 44 covers the drain 39 and drainage control device 35 and extends upwards to the height of the inner side wall 33. A plurality of separation walls 46 extend radially from the core 44 and contact the inner side wall 33, thereby defining a plurality of compartments 47 that are filled with compressed reactant compound. Compression of the reactant compound is desirable in order to remove air or gas that is trapped within the powder of the reactant compound, and also to increase the reactant compound density. The core 44 and separation walls 46 are made of a reticular aluminum foam, fibrous material, or another suitable material that is permeable to hydrogen gas and water but impermeable to the reactant compound powder. The foam acts as a water path within the cell 30 that increases the exposure surface of the reactant compound to water thus improving the overall reaction efficiency, and hydrogen production responsiveness.

While a plurality of radially extending separation walls 46 are shown, other suitable configurations are contemplated for delivering water to the compartments.

The cell 30 also has a circular cover plate 40 that is located under the lip 32 and above the top edge of the inner side wall 33. The cover plate 40 has around its periphery, a downwardly extending lip 41 that is inserted into the annular cavity defined by the shell side wall and inner side wall 33. The lip 41 has a plurality of vertically-extending, circumferentially-spaced outer slots 48 and an annular gap 50 that define a water passageway from the outside of the cell 30 to the radial grooves 34. The outer slots 48 are circumferentially separated by a plurality of circumferentially-spaced, radially extending protrusions 49.

The cover plate 40 has an opening through its center for receiving a semi-permeable diffusion puck 42. The puck's porosity is selected to be highly permeable to gaseous hydrogen, slightly permeable to the inside entrapped water, and impermeable to the reaction compound powder. A suitable material for the puck 42 is DUOCEL aluminum foam by ERG Aerospace. An O-ring 43 is embedded near the outer periphery of the top surface of the cover plate 40, below the annular lip 32.

When the cell 30 is dry, the cover plate 40 rests on top of the inner side wall 33, and the check valve 36 is in its open position. As water enters the bottom of the container 10 and rises to the base plate of the shell 31, the check valve 36 floats into its closed position and closes the drain 39. As the water continues to rise above the annular lip 32, water flows into the cell 30 through the annular gap between the lip 32 and cover plate 40, through the plurality of outer slots 48 then through the annular gap 50 through the grooves 34 and into each compartment 37. As water enters the cell 30, the cover plate 40 floats upwards until it contacts the lip 32 and seals the cell 30 from outside water and also against the back flow of a foaming colloidal suspension produced inside the cartridge shortly after the water starts to react with the reactant compound, by way of contact between the O-ring 43 and the lip 32, thereby trapping a selected amount of water within the cell 30. The selected water amount corresponds to the amount of reaction compound in the cell 30 and represents the total volumetric expansion of the reactant powder after the reaction with water. Calculations predict that about two grams of water are required per gram of aluminum powder to produce 0.11 g of hydrogen gas and 2.89 g aluminum hydroxide by-product.

When the water contacts the reactant compound, hydrogen gas is produced. The product hydrogen exits the cell 30 through the porous puck 42 and flows upwards to the top of container 10. Product oxygen reacts with metallic aluminum to form an oxide/hydroxide layer that physically adheres to the anti-passivation material. Once the reaction has progressed to a certain point, the resulting solid byproducts expand to fill up the volume inside the cell 30, thereby securing the cover plate 40 in its top position. In other words, the water split reaction causes the volume of reactant compound inside the cell 30 to increase dramatically and rise upwards inside each compartment 37, pushing the cover plate 40 upwards and thereby securing the cover plate against the shell lip 32. The entrapped residual solid byproduct can be later removed and recycled.

As water rises inside the container 10, each successively stacked cell 10 will be filled with water and activated to produce hydrogen gas. Water flows upwards through the container 10, through the vertically extending slots 24 in the cell holder 22, until the uppermost cell 30 is immersed in water and the reactant compound therein is reacted. When all the cells 30 are exhausted, unreacted water is drained from the container 10 via port 12. As the water level decreases inside the container 10, the check valve 36 for each cell 30 opens and unreacted water drains out of the cell 30.

The cells 30 are removable from the container 10 and can be recharged, recycled and/or stored for future use. When the cell 30 is made primarily of aluminum, and the reactant compound is aluminum/aluminum oxide, the cell 30 and reactant compound together can be recycled at aluminum production/recycling plants by methods known in the art.

When outside of the container 10, the cells 30 should be sealed from ambient air to prevent passivation of the reactant metal, by sealing all the water passageways into the cell 10 with adhesive sealing tape or other suitable material as is known in the art. As mentioned above, the preparation and loading of the reactant compound into the cells 30 should be performed in an inert environment to prevent oxidization of the reactant metal with ambient air. Testing has shown that the reactant compound loses its reactive properties when exposed to air for extended periods of time. A few hours of indirect exposure to the air will substantially reduce the performance of the reactant compound. The cell container must be free of oxygen and be sealed from the environment to prevent oxygen or moisture to enter and contact powders. The sealing tape should be removed only just prior to loading the cells 30 into the container 10. Properly sealed, the cells 30 enable the reactant compound to be stored indefinitely.

Water Supply Circuit

Referring again to FIG. 1, the hydrogen reactor 110 is fluidly coupled to the first automatic water supply circuit 120(b) by a water conduit 200 connected at one end to the water intake port 12 of the reactor 110. The water conduit 200 terminates at its other end at a water source 121. A fixed capacity pump 124 is coupled to the water conduit 200 and operates to pump water from the water source 121 through the conduit 200, past a water filter 122 in the conduit 200, past a one-way check valve 125 that prevents backflow into the pump 124, and into the reactor 110 via the intake port 12. An adjustable pressure relief valve 134 is coupled to the conduit 200 downstream of the pump 124 and to the water source 121, and operates to relieve the pump's pressure when the pressure downstream of the pump 124 exceeds a selected value. A trotting valve 136 is coupled to the conduit downstream of the pump 124 and can be manually operated to fine tune the water flow rate through the conduit 200, and thus the rate of water rise in the reactor 110.

A multi-level water measurement and switching device 137 is fluidly coupled to the reactor 110 to measure the water level therein. The multi-level water measurement and switching device 137 comprises a housing having a plurality of water level probes L1 to Ln, wherein n=the number of cells 30 in the reactor 110. The multi-level measurement and switching device 137 is fluidly coupled at the bottom of its housing by a shut off valve 128 to the water conduit 200, and at the top of the housing by a shut off valve 127 and a conduit 138 to the port 204 of the discharge manifold 140.

A water drainage valve 130 is fluidly connected to the downstream end of the conduit 200 near the reactor water inlet port 12 and can be opened to drain unreacted water out of the reactor 110 into a collector 221; alternatively, the collector can be the water source 121. Such draining can be performed to service the cells 30 inside the reactor 110, to replace spent cells 30 with fresh cells 30, etc.

Water expansion mechanisms 160(a) and 160(b) are fluidly coupled to the reactor 110 to prevent the pressure inside the container 10 from exceeding a pre-set value and to smooth out pressure variations therein, by enabling isobaric expansion inside the container 10, i.e. by enabling the water volume inside the container 10 to change so that the internal pressure remains relatively constant. Two different types of water expansion mechanisms 160(a) and 160(b) are shown coupled to reactor 110; however, the system 100 can alternatively have only a single water expansion mechanism, multiple expansion mechanisms of the same type or a combination of different types. A first type of water expansion mechanism 160(a) comprises a fluid sealed container 161 having a flexible diaphragm 162 attached to the inside wall of the container 161. The diaphragm 162 separates the container 161 into a gas chamber and a water chamber. The water chamber is fluidly coupled to the conduit 200 near the reactor water inlet port 12 by a valve 163, which enables the expansion mechanism 160(a) to be detached from conduit 200, e.g. for inspection or maintenance. The water can flow out of the reactor 110 via port 12 and directly into the water chamber when the pressure inside the container 10 exceeds a maximum operating pressure; for a container 10 having a maximum allowable pressure of 150 psig the maximum operating pressure is 120 psig. Water entering the expansion container 161 deflects the diaphragm 162, which compresses the gas inside the gas chamber thereby increasing the downstream volume and releasing the inlet pressure.

A second type of water expansion mechanism 160(b) comprises a pressure relief valve 147 also coupled to the water conduit 200 near the reactor water inlet port 12. The valve 147 is calibrated to open at a preset value that is below the maximum allowable pressure but higher than maximum operating/working pressure collected inside the reactor container 10 (e.g. 140 psig for a 150 psig rated container working at 120 psi); when opened, the valve 147 allows water to flow from the reactor 110 through port 12 and conduit 200 and through the valve 147 into the water collector 221.

Both types of water expansion mechanisms 160(a) and 160(b) can be mounted inside or outside of the reactor 110.

The operation of the water supply circuit 120(b) is controlled by a programmable process controller 133. The controller 133 is communicative with a water level sensor 135 located in the water source 121, as well as an electric actuator 132 coupled to the pump 124 by coupling 131. The controller 133 uses the water level sensor 135 to monitor the water level in the water source 121, and will stop system operation if the water level is too low, to avoid running the pump dry, avoid cavitation, as well as to prevent entrapped air from being carried away with water into the reaction chamber and mix with product hydrogen to create a highly combustive and explosive mixture.

Optionally, the reactor 110 can be coupled to other water circuits such as manually actuated water circuit 120(a) or automatically actuated water circuit 120(c).

The manually actuated water supply circuit 120(a) comprises a water source 121, a water conduit 200 having in downstream order: a filter 122, a first check valve 123, a manually actuated pump 124, a second check valve 125 for preventing backflow into the pump 124, a shut off valve 126 for bleeding water from the conduit 200 back into the water source 121, and a water expansion mechanism 160 having a pressure relief valve 147 coupled to the downstream end of the conduit 200. A sight glass level indicator 148 for measuring the water level inside the reactor 110 can be coupled via shut valves 127 and 128 to the reactor 110. The pressure inside the reactor 110 can be monitored through a pressure gauge 129 that can be directly connected to the gaseous pressure port 204 before being further serially connected to the liquid level measuring device 148 via valve 127.

The second automatically actuated water supply circuit 120(c) lacks a water level reader but is otherwise essentially identical to the first automatically actuated water supply circuit 120(a). Particularly, the pump of this circuit 120(c) is a dosing pump with positive displacement that can be actuated by a solenoid, i.e. a metering pump. Do to its specific actuation, the flow rate of such a pump can be accurately set and finally depends on the length and number of strokes the oscillating solenoid makes. Once the length of the stroke is manually adjusted, the only remaining parameter that controls the amount of water injected into the circuit is the number of strokes that are counted via process controller 133.

The particular water supply circuit chosen depends on the operating condition and size of reactor 110. For portable or low power applications, manual actuation may be particularly desirable, as no electric power is required to operate the system 100. In the manually actuated water circuit 120(a), the pump 124 is manually operated to inject water into the reactor 110 at appropriate intervals of time determined from the pressure readings from the pressure gauge 129 and the water level reading from indicator 148. Once the internal pressure falls below a pre-determined level, the operator can pump more water into the reactor 110 to activate additional cells 30 to produce hydrogen. The manually actuated water supply circuit 120(a) does not require a pressure sensor 139 attached to the reactor 110 nor a process controller 133.

Hydrogen Buffer

Referring again to FIGS. 1 and 2, the buffer 150 is a metal hydride tank that stores surplus hydrogen and serves as an isobaric expansion vessel for gas inside the container 10: once the internal pressure inside the container 10 rises to a certain level, hydrogen gas flows from the container 10 into the buffer 150 through manifold 140, through port 203, through one way check valve 149 in conduit 141 and into the metal hydrate pressure vessel 143 of the buffer 150. The check valve 149 is calibrated to open at a threshold pressure that corresponds to the minimum charging pressure of the buffer (e.g. 100 psig for a 150 psig container 10 with a 1.5 safety factor and filled with a metal hydride material having a minimum charging pressure of 100 psig). The buffer 150 has a shut off valve 142 that enables the pressure vessel 143 to be easily removed from the system for maintenance etc.

The check valve 149 is bridged by a three-way shuttle valve 151, otherwise known as a "double check with cross bleed" valve 151. This valve 151 has two inlets, namely a manifold inlet 141, and a buffer inlet 144 and a single outlet that is directly connected to a pressure regulator 145 having a pressure gauge 146. The shuttle valve 151 resembles a 3-way valve with no normal position. A floating poppet, or shuttle, is free to move back and forth inside the shuttle valve 151, closing the inlet having the lower pressure, and opening the inlet with higher pressure.

The buffer 150 can be a metal hydride type L vessel from SOLID-H™ that has a minimum charging pressure of 100 psig at ambient temperature. Therefore, whenever the pressure inside the container 10 exceeds 100 psig and causes valve 149 to open, hydrogen will flow into the buffer 150. However, different buffer materials and charging pressure can be substituted within the scope of this invention. When the pressure inside the container 10 reaches or exceeds 100 psig, hydrogen will flow simultaneously through both check valve 149 and shuttle valve 151. Hydrogen flowing through the check valve 149 will charge the buffer 150, and hydrogen flowing through the shuttle valve 151 (via inlet 144) will be regulated by the pressure regulator 145 and then supplied to the consumer. When the pressure inside the reactor 110 is below the calibrated pressure of the check valve 149 (100 psig), the check valve 149 closes and the buffer 150 switches to discharging mode, releasing the hydrogen at a pressure of 30 psig at ambient temperature, providing a metal hydrate type L is employed. In particular, hydrogen will flow out of the buffer 150 only when the pressure of the container is bellow the discharging pressure of the metal hydride contained in the buffer, e.g. 30 psi at ambient pressure for the type L container.

The purpose of the shuttle valve 151 is to accept flow from one of the two inlets 141 and 144 having the higher pressure, and to pass the hydrogen through to the outlet while keeping inlet fluids 144 and 141 isolated from another. If the hydrogen pressure inside the reactor 110 falls below the discharge pressure of the buffer 150 (30 psig for type L metal hydride) the shuttle valve 151 closes flow from manifold inlet 144 and opens flow from the buffer inlet 141, thereby providing hydrogen to the consumer from the buffer 150.

Again, the schematic diagram in FIG. 1 shows the buffer 150 and all adjacent self-regulating mechanisms 151, 144, 141, 142, 149 as being external parts but they can be optionally installed inside the reactor 110.

The buffer 150 serves as a temporary hydrogen storage device but also as a gaseous expansion mechanism to help to maintain a gas/liquid pressure balance inside the container 10, and to enable hydrogen to be supplied on demand to the hydrogen consumer. As each unit cell 30 produces hydrogen at a rate according to a particular water-split reaction profile (see FIG. 7(a)), there may be occasions when the cells' hydrogen production rate does not match the load, especially when the load is variable. When the load is lower than the production rate, the buffer 150 operates to store hydrogen; when the load is higher than the production rate, the buffer 150 operates to discharge hydrogen to "top up" the hydrogen being produced by the activated cells 30 provided that the pressure in branch 141 will balance the pressure from branch 144, thus adding the flow rates from both sources. If the pressure from both sources is not balanced, the source with the higher pressure will supply solely the required flow rate.

The buffer 150 also serves to collect hydrogen during generator shut-down and supply hydrogen during generator start-up. During shut down, water supply to the generator 110 is stopped, but hydrogen is still being produced by residual unreacted water in one or more cells; when the consumer load is stopped, this residual product hydrogen is stored in the buffer provided that the pressure is at or above the charging pressure. The buffer 150 can also serve to provide an immediate flow of hydrogen to a connected hydrogen consumer during generator start up when the cells 30 have yet to reach their peak hydrogen release rate, and for smoothing hydrogen production rates to more closely follow load variations.

Automatic Control

The operation of the system 100 can be manually controlled when using the manually actuated water circuit 120(a) as previously described, or automatically controlled by the controller 133 when using one of the automatically actuated water circuits 120(b) or 120(c).

The controller 133 activates hydrogen production in a cell 30 by pumping sufficient water into the container 10 to flood the reactant compound compartments 37 of the cell 30. The controller 133 controls the timing of each cell's activation by controlling the water flow rate into the container 10. As water is pumped into the bottom of the container 10, the cells 30 are activated sequentially from the bottom upwards as the water level rises inside the container 10.

Figure 7B:
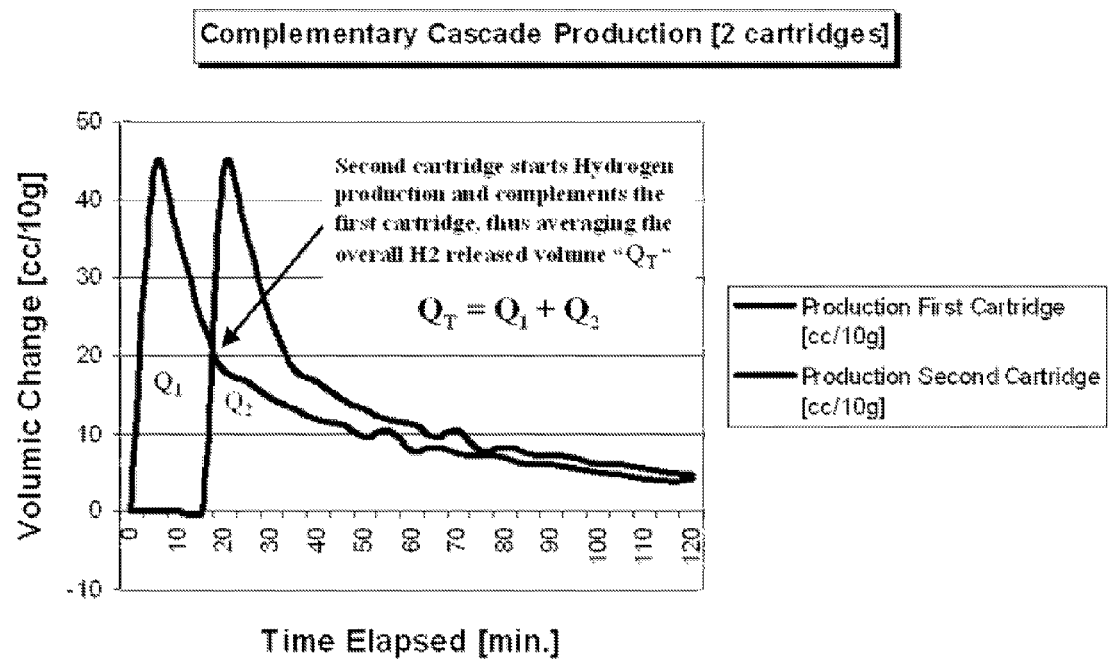
FIG. 7(b) is a graph of a pair of such profiles in time-cascaded arrangement.

The controller 133 in both circuits 120(b) and (c) can be programmed with the water-split reaction profiles for each reactant compound used by the generator 110. With such profiles, the controller 133 can calculate the number of cells 30 that must be activated at any given time to meet the load demanded by the hydrogen consumer. In this regard, the controller 133 is communicative with a pressure sensor 139 via wiring 202. Also, the controller 133 can refer to the appropriate profile to predict the production drop off from a cell 30 in order to determine the appropriate time to activate a fresh cell 30 such that a relatively constant hydrogen production rate is maintained. This staggered activation of cells 30 is called "cascading", and is shown in FIG. 7(b), where a second cell 30 is activated at a selected time after a first cell 30 has been activated.

When water circuit 120(b) is coupled to the system 100, the controller 133 is programmed to control the operation of the system 100 as follows:

Any entrapped air is firstly removed from the system 100 by known methods such as nitrogen purging or vacuuming.

The controller 133 then receives a start signal (either manually entered, or automatically from a time delay relay), and activates the pump 124 to supply water into the reactor 110 at a preset flow rate. While the reactor is producing hydrogen, the pressure inside the reactor will increase until a threshold pressure is reached and the shuttle valve 151 opens the reactor inlet 144 to flow hydrogen from the reactor 110 to the consumer. In the meantime, the shuttle valve 151 opens the buffer outlet 141 and flows hydrogen stored in the buffer 150 to the consumer. The pressure regulator 145 controls the hydrogen pressure output at all times, and is preset to comply with consumer's pressure requirements (the load).

During operation, the controller 133 monitors the pressure sensor 139 to determine whether the preset water flow rate produces hydrogen at a rate that matches the hydrogen load, and if not, adjusts the operation of the pump 124 to flow water at an appropriate rate. For example, when the hydrogen load exceeds the hydrogen production rate, the internal pressure in the reactor 110 will decrease over time; the controller 131 monitors the internal pressure via sensor 139 and uses the hydrogen production profile stored within its memory to calculate the appropriate change in water flow rate required in order to match the hydrogen production rate to the hydrogen load. The manually actuated water supply circuit lacks a process controller 133 and pressure sensor 139.

When the hydrogen produced inside the reactor 110 rises beyond a certain pressure threshold, the buffer check valve 149 opens and hydrogen flows into the buffer 150, and some water drains out of the container 10 and/or into the water expansion mechanism 160. The controller 133 can also reduce the flow rate of water into the container, thereby slowing the rate at which cells 30 inside the reactor 110 are activated.

As mentioned, cells 30 can be timed to produce hydrogen in a cascaded manner, i.e. each cell 30 can be activated at different times to produce hydrogen. This cascaded design is particularly advantageous, as only as many cells 30 are activated as needed to provide the demanded hydrogen flow rate. If the hydrogen load demanded exceeds the maximum hydrogen flow rate that can be produced by a single cell 30, then the controller 133 can activate two or more cells 30 simultaneously to meet the demand (as well as use the buffer 150 to supply extra hydrogen). Or, if the hydrogen load is relatively low, then the controller 133 can activate one cell 30 at a time or even delay the intervals between cell activation.

The pressure regulator 145 can be utilized to adjust the hydrogen pressure to the level demanded by the hydrogen consumer. In particular, the timing of each cartridge's activation can be selected so that the generator 110 produces a smooth hydrogen flow rate, by delaying the activation of one cartridge until another cartridge's hydrogen release rate begins to dip.

Figure 8:
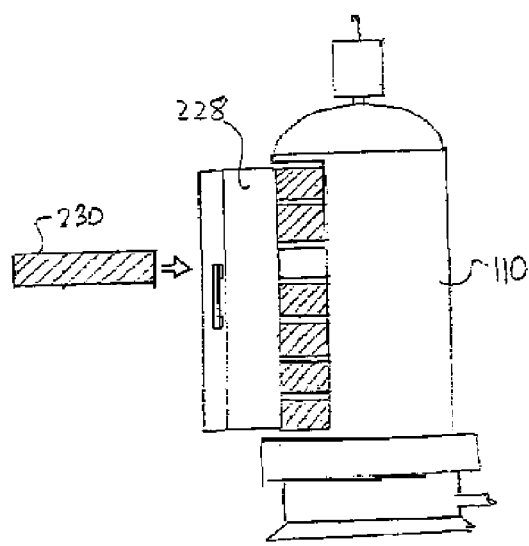
FIG. 8 is a schematic elevation view of a hydrogen generator having hot-swappable cells according to another embodiment of the invention.

According to another embodiment of the invention and referring to FIG. 8, the reactor 110 can be modified such that each cell 30 can be individually removed or "hot swapped" during operation. The modifications include providing an access door 228 in the reactor outer wall, sealing each cell 230 such that each cell 230 is a pressure vessel that is sufficient to withstand the pressures experienced during hydrogen gas production, and that has a closable water inlet for receiving reactant water (not shown), and a closeable outlet for discharging hydrogen and return water (not shown). When a cell 230 needs to be hot-swapped, the inlet and outlets are closed to prevent water and hydrogen gas to leak out when the cell 230 is removed.

Figure 9:
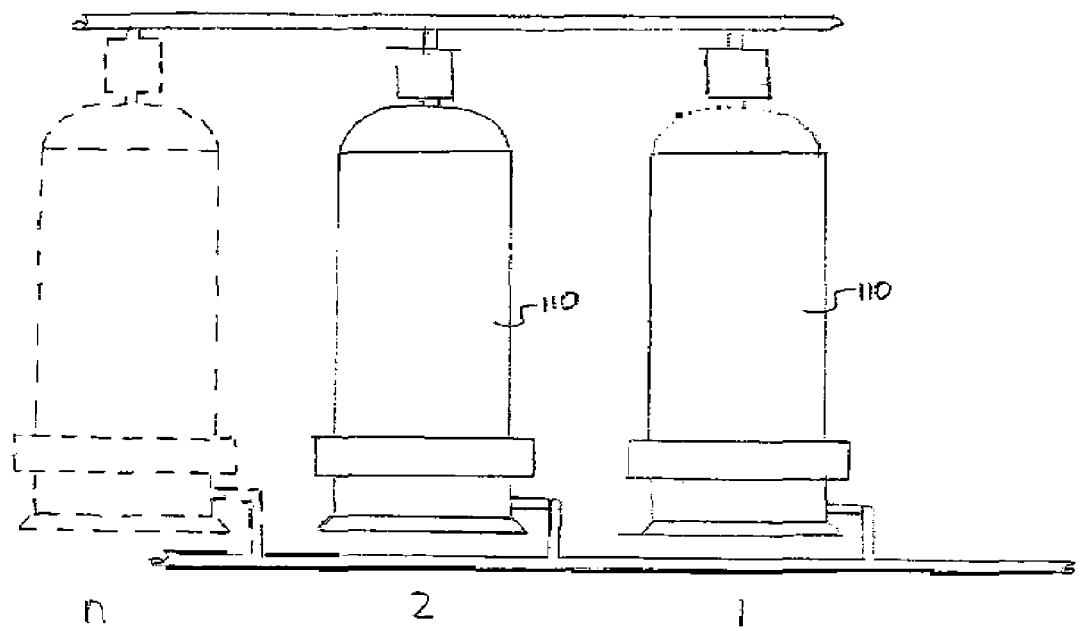
FIG. 9 is a schematic elevation view of a plurality of hydrogen generators fluidly connected in parallel and hot-swappable, according to another embodiment of the invention

According to another embodiment of the invention and referring to FIG. 9, multiple hydrogen reactors (1 through n) can be fluidly coupled together in parallel to form a "horizontally cascaded" reactor system in which the reactors share the same water supply circuit and the same hydrogen collection circuit. Each reactor is independently controllable, such that the reactors can be activated one-by-one or in groups over staggered time intervals (horizontally cascaded) or simultaneously if so desired. Since the reactors are externally and fluidly connected to the same water supply and hydrogen collection circuits, the reactors can share the same peripherals, e.g. level-measuring devices, pressure regulators, gas expanders, buffers, water expanders and water supply circuits including controllers, and pressure relief valves. Furthermore, a reactor n can be decoupled from the system and taken off-line while the other reactors in the system are still active, i.e. producing hydrogen and supplying same to a connected hydrogen consumer. The off-line reactor can then be disassembled and the spent cells removed and recharged. In other words, the horizontally-cascaded design enables individual reactors to be "hot-swapped" during system operation.

While the present invention has been described herein by the preferred embodiments, it will be understood to those skilled in the art that various changes may be made and added to the invention. The changes and alternatives are considered within the spirit and scope of the present invention.

What is claimed is:

1. A hydrogen generator system for generating hydrogen from water split reaction, comprising:
   a) a pressure container having a water inlet for fluidly coupling to a water source and flowing water to a bottom of the container, and a product hydrogen outlet for fluidly coupling to a hydrogen consumer and flowing hydrogen collected inside the container to the consumer;
   b) a plurality of cells vertically stacked inside the container and containing a reactant compound comprising a mechanical mixture of a reactant metal and an anti-passivation material and producing hydrogen gas upon contact with water, the cells being fluidly communicative with water and hydrogen gas and stacked such that water rising from the bottom of the container sequentially activates each immersed cell to produce hydrogen gas, wherein each cell of said plurality of cells comprises a sealable internal reaction chamber for confining a selected amount of water and reactant compound therein after said cell is immersed.

2. The system of claim 1 further comprising a gas expansion device fluidly coupled to the container, the gas expansion device being calibrated to receive and store hydrogen gas produced by the generator at a selected charging pressure.

3. The system of claim 2 wherein the gas expansion device is a hydrogen storage buffer calibrated to discharge stored hydrogen to the consumer at a selected discharge pressure.

4. The system of claim 3 wherein the buffer is a pressure vessel containing a metal hydride.

5. The system of claim 1 wherein the reactant metal is selected from the group consisting of aluminum (Al), magnesium (Mg), silicon (Si), and zinc (Zn).

6. The system of claim 5 wherein the anti-passivation material is selected from group consisting of alumina, ceramic compounds containing aluminum ions, carbon (C), calcium carbonate ($CaCO_3$), calcium hydroxide ($Ca(OH)_2$), polyethylene glycol (PEG), and combination thereof, magnesium oxide (MgO), silicon dioxide ($SiO_2$), and (ZnO).

7. The system of claim 1 wherein each cell comprises a shell having a plurality of partitions inside the shell that define a plurality of compartments that each store reactant compound, the partitions being made of a semi-permeable material that is permeable to water and gas but impermeable to the reactant compound.

8. The system of claim 7 wherein the partition material is a reticular aluminum foam.

9. The system of claim 7 wherein each cell further comprises a buoyant water feed valve comprising a plate adapted for sealingly closing an opening in the top of the shell, the valve being in a depressed position that allows water into the cell when the reactant compound is dry, and is in an elevated position that closes the opening in the top of the shell to outside water when the cell is filled with water.

10. The system of claim 9 wherein the inner volume of the cell is selected to accommodate the expansion of reacted reactant compound.

11. The system of claim 9 wherein the inner volume of the cell is selected so that the expansion of reacted reactant compound elevates the water feed valve into a closed position.

12. The system of claim 7 further comprising a buoyant water drain valve located in a water drain in the bottom of the shell, the drain valve being in an open position when the cell is not immersed in water, and in an elevated position that closes the water drain when the water level outside the cell rises above the bottom of the shell.

13. The system of claim 1 further comprising a water expansion device fluidly coupled to the container and calibrated to receive and store water at a selected pressure.

14. A hydrogen generator system for generating hydrogen from water split reaction, comprising:
 a) a reactor comprising
  i) a pressure container having a water inlet for fluidly coupling to a water source and flowing water to a bottom of the container, and a product hydrogen outlet for fluidly coupling to a hydrogen consumer and flowing hydrogen collected inside the container to the consumer; and
  ii) a plurality of cells vertically stacked inside the container and containing a reactant compound comprising a mechanical mixture of a reactant metal and an anti-passivation material and producing hydrogen gas upon contact with water, the cells being fluidly communicative with water and hydrogen gas and stacked such that water rising from the bottom of the container sequentially activates each immersed cell to produce hydrogen gas, wherein each cell of said plurality of cells comprises a sealable internal reaction chamber for confining a selected amount of water and reactant compound therein after said cell is immersed;
 b) a hydrogen storage buffer fluidly coupled to the reactor, calibrated to receive and store product hydrogen gas from the reactor at a selected charging pressure, and to discharge hydrogen gas to the consumer at a selected discharge pressure; and,
 c) a water supply circuit fluidly coupled to the water inlet of the reactor and having a pump for delivering water from a water source to the cells.

15. The system of claim 14 further comprising a controller communicative with the pump and programmed to operate the pump to deliver water to the reactor at a rate that corresponds to the rate of hydrogen demanded from the hydrogen consumer.

16. The system of claim 15 wherein the controller operates the pump to deliver water to the cells at a rate that activates a cell to produce hydrogen around the same time the hydrogen production rate of a below activated cell begins to decline.

17. The system of claim 14 wherein the reactant metal is selected from the group consisting of aluminum (Al), magnesium (Mg), silicon (Si), and zinc (Zn).

18. The system of claim 14 wherein the anti-passivation material is selected from group consisting of alumina, ceramic compounds containing aluminum ions, carbon (C), calcium carbonate ($CaCO_3$), calcium hydroxide ($Ca(OH)_2$), polyethylene glycol (PEG), and combination thereof, magnesium oxide (MgO), silicon dioxide ($SiO_2$), and (ZnO).

19. The system of claim 14 further comprising a water expansion device for providing isobaric expansion inside the container, and being fluidly coupled to the water supply circuit and having a valve calibrated to open at a selected pressure to allow water from the container into the water expansion device.

20. The system of claim 14 further comprising a plurality of reactors each being fluidly coupled in parallel to the buffer and to the water supply circuit.

21. The system of claim 20 wherein each reactor comprises a water flow control valve coupled to the water supply circuit and the controller is further programmed to operate each control valve to independently control the flow of water into each reactor.

22. The system of claim 9 wherein said top of said shell comprises a lip defining said opening and wherein said plate comprises an O-ring located on an upper surface thereof, wherein said O-ring sealingly engages said lip when said plate floats upwardly to said elevated position.

23. The system of claim 1 wherein each cell of said plurality of cells comprises a valve for sealing said reaction chamber after said cell is immersed.

24. The system of claim 7 wherein each cell comprises valve means for closing an opening in the top of said shell, wherein said valve means is movable between an open position allowing water into said cell when said when said reactant compound is dry and a closed position closing said opening to outside water when said cell is filled with water.

25. The system of claim 23 when said valve means is a buoyant plate which sealingly engages said top of said shell in said closed position.

26. The system of claim 1 wherein each of said cells comprises a shell defining said internal reaction chamber, wherein said shell is formed from a thin recyclable aluminum sheet.

* * * * *